United States Patent [19]
Kiel

[11] Patent Number: 6,029,636
[45] Date of Patent: Feb. 29, 2000

[54] AIR INTAKE PRE-HEATER

[76] Inventor: Lonn M. Kiel, Rte. 3, Box 71, Crookston, Minn. 56716

[21] Appl. No.: 09/243,390

[22] Filed: Feb. 1, 1999

[51] Int. Cl.[7] .................................................... F02M 33/00
[52] U.S. Cl. ............................................................ 123/556
[58] Field of Search ............................... 123/556, 65 EM

[56] References Cited

U.S. PATENT DOCUMENTS

| | | | |
|---|---|---|---|
| 3,915,134 | 10/1975 | Young et al. | 123/119 |
| 4,071,006 | 1/1978 | Harada | 123/119 |
| 4,161,931 | 7/1979 | Giardini et al. | 123/122 |
| 4,387,694 | 6/1983 | Yoshiba et al. | 123/571 |
| 4,428,355 | 1/1984 | Yokooku | 123/571 |
| 4,495,929 | 1/1985 | Maeda et al. | 123/569 |
| 4,611,567 | 9/1986 | Covey | 123/557 |
| 4,890,595 | 1/1990 | Fischer | 123/556 |
| 5,040,517 | 8/1991 | Cox | 123/556 |
| 5,094,218 | 3/1992 | Everingham et al. | 123/571 |
| 5,408,973 | 4/1995 | Spangjer | 123/556 |
| 5,443,547 | 8/1995 | Morikawa | 60/274 |
| 5,520,161 | 5/1996 | Klopp | 123/676 |
| 5,746,190 | 5/1998 | Honda | 123/568 |

*Primary Examiner*—Marguerite McMahon
*Attorney, Agent, or Firm*—Curtis V. Harr

[57] ABSTRACT

A heat exchanger that is connected to a diesel engine's exhaust system in a manner that forces the hot exhaust gases to pass directly through an internal heat exchange chamber. This is accomplished by placing a heat exchanger unit within the body of the air filter canister which is typically installed externally on a truck. This heat exchanger is then connected at its lower end to the primary exhaust system of the truck by means of section of exhaust tubing and at its upper end to a secondary exhaust pipe. Thus, when the hot exhaust gases enter the heat exchanger within the air cleaner, the exchanger is rapidly heated up which serves to heat the air passing through the filter canister prior to its entering the engine. This heated air not only speeds up the warm up process of the engine but also increases the operating efficiency of cold diesel engine because the burning properties of diesel fuel are enhanced at higher temperatures. The diversion of exhaust gases from the primary exhaust system to the heat exchanger is controlled by a weighted vane which is fitted within the exhaust system just behind the point where the heat exchange diversion pipe joins the primary exhaust pipe.

12 Claims, 4 Drawing Sheets

AIR INTAKE PRE-HEATER

BACKGROUND OF THE INVENTION

The present invention relates to an improvement in the manner in which a diesel engine is brought to operating temperature during start up and cold weather operations. More specifically, to an add on unit that will use the heat naturally generated by the engine's exhaust system to speed up the warming of the engine. The present invention greatly reduces warm up time for diesel engines thereby minimizing the excessive wear and tear caused to such engines in cold weather and startup periods.

For a variety of reasons a typical truck diesel engine may spend between 40 and 70 percent of its useful life idling at low revolutions per minute (RPM)s. During this idling time, these engines consume from 1.5 to 3 gallons of diesel fuel per hour. From these facts it can be seen that in fuel costs alone this idling time adds significantly to the annual costs of operating a diesel truck and thus, anything that can be done to increase fuel efficiency during these periods could translate into large fuel savings.

It had long been thought by truck operators that the idling of diesel engines for long periods of time, such as overnight, had no adverse wear effects on the engine itself. This, however, is not the case. In fact, it has been estimated that one hour of idling time causes the equivalent wear to a diesel engine as 80 miles of driving.

For a diesel engine to operate efficiently it must maintain an internal temperature of 175 degrees Fahrenheit. If the temperature falls below this point it allows for the accumulation of water and sulfur in the engine. When a diesel engine is left to idle in cold weather the operating temperature often drops below the optimal operating temperature, thus, resulting in the above described situation. This condition dilutes the engine oil, which increases engine wear due to the lack of lubrication, and can cause the engine valves to stick which result in higher maintenance costs during the life of the engine.

Therefore, from the foregoing discussion it can be seen that it would be highly desirable to provide a method of maintaining a truck's diesel engine at a suitable temperature during periods of idle and in cold weather This method should accelerate the process of bringing an engine up to a proper operating temperature so as to optimize efficiency during startup and periods of idle.

SUMMARY OF THE INVENTION

Therefore, it is the primary objective of the present invention to provide a method of heating the air entering a diesel engine quickly during warm-up in cold weather conditions, thereby, greatly reducing the time it takes for such engines to reach operating temperatures.

It is an additional objective of the present invention to provide such an air heating system that operates only when the truck is stationary or moving slowly and the engine is running at lower RPMs.

It is a further objective of the present invention of providing an auxiliary exhaust system that dispels exhaust gases that are generated during the time that the invention is engaged and working.

These objectives are accomplished by the use of a heat exchanger that is connected to a diesel engine's exhaust system in a manner that forces the hot exhaust gases to pass directly through an internal heat exchange chamber. This is accomplished by placing a heat exchanger unit within the body of the air filter canister which is typically installed externally on a truck. This heat exchanger is then connected at its lower end to the primary exhaust system of the truck by means of a section of exhaust tubing and at its upper end to a secondary exhaust pipe. Thus, when the hot exhaust gases enter the heat exchanger within the air cleaner, the exchanger is rapidly heated up which serves to heat the air passing through the filter canister prior to its entering the engine. This heated air not only speeds up the warm up process of the engine but also increases the operating efficiency of cold diesel engine because the burning properties of diesel fuel are enhanced at higher temperatures.

The diversion of exhaust gases from the primary exhaust system to the heat exchanger is controlled by a weighted vane which is fitted within the exhaust system just behind the point where the heat exchange diversion pipe joins the primary exhaust pipe. This vane remains closed when the engine is operating at a speed of 1200 rpms or lower. This serves to divert the exhaust gases to the heat exchanger in these operating conditions. As the speed of the engine increases, the natural pressure generated by the exhaust gases forces the vane open which allows the gases to pass normally through where they are dispelled by the primary exhaust pipe.

Finally, the secondary exhaust pipe is also fitted with an air intake port which is located in a forward facing orientation just above the air filter canister. This air intake port is also internally fitted with a weighted vane which prevents air from entering the secondary exhaust pipe when the truck is stationary or moving at low speeds. Thus, when the exhaust gas vane is closed and the exhaust gases are passing through the heat exchanger and out the secondary exhaust pipe, the air intake vane is closed and the flow of gases out of the secondary exhaust pipe is uninterrupted. Conversely, when engines RPMs are increased (which generally results in the truck moving forward) and the exhaust vane is opened the air intake vane is also opened by air pressure generated by the trucks forward motion. This allows fresh air to enter the secondary exhaust pipe where it travels down to the primary exhaust system to help ensure that the exhaust gases exit the primary exhaust pipe as originally intended by the manufacturer.

For a better understanding of the present invention reference should be made to the drawings and the description in which there are illustrated and described preferred embodiments of the present invention.

DESCRIPTION OF THE PREFERRED EMBODIMENT

Figure 1:
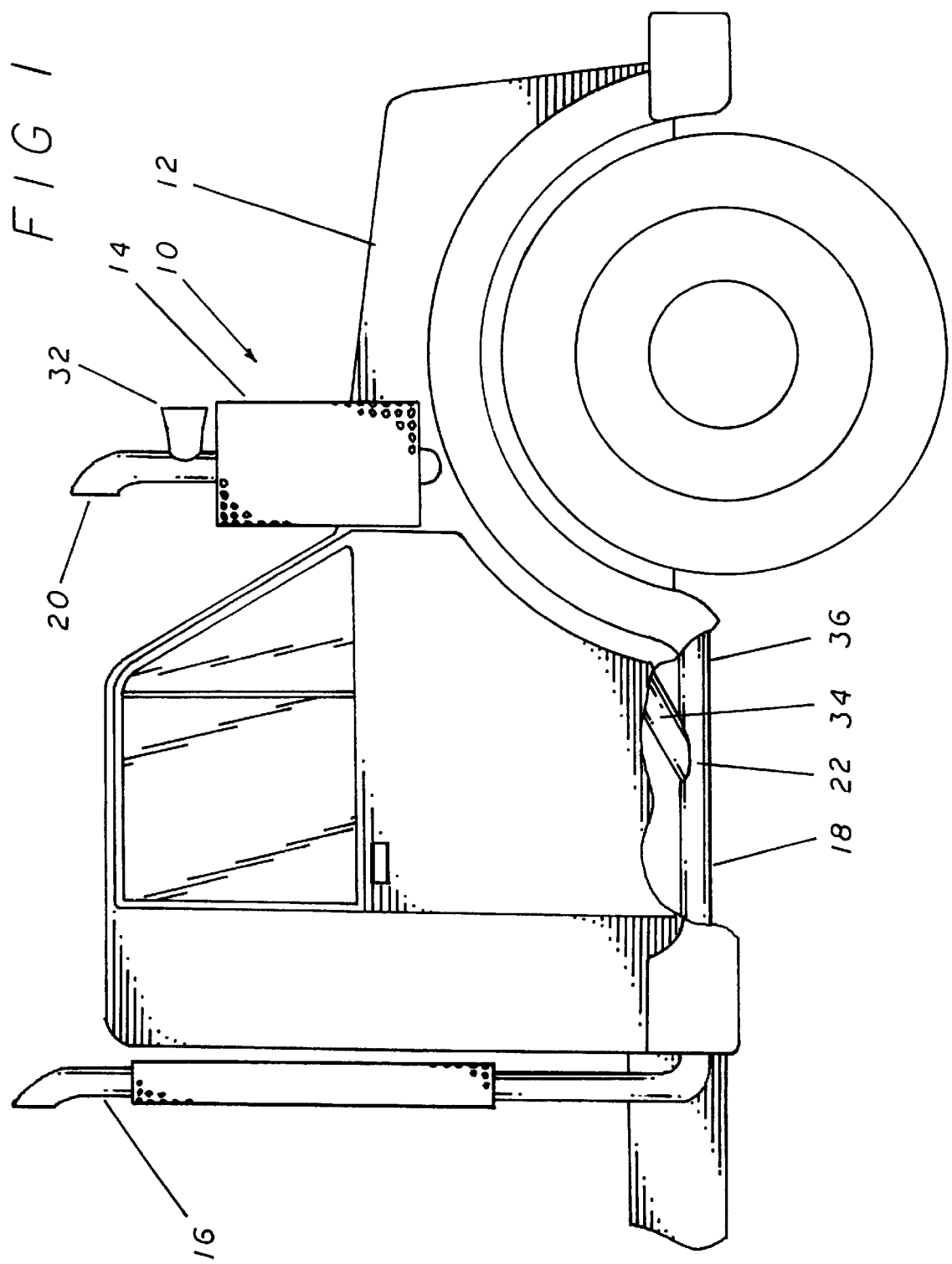
FIG. 1 is a side elevation view of the present invention as installed on a typical diesel truck showing the general orientation of the major components with respect to the truck's body.
Figure 2:
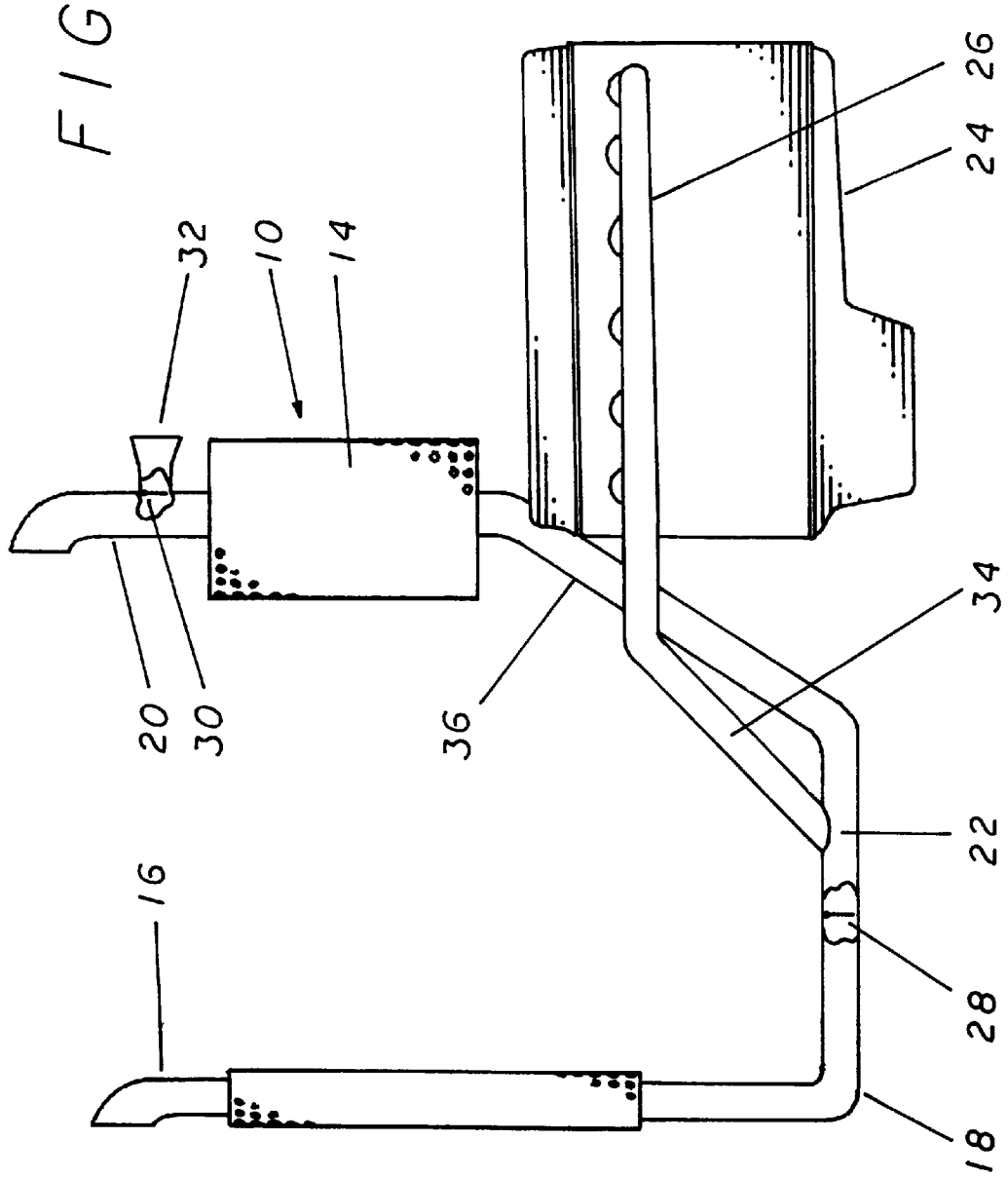
FIG. 2 is a side elevation view of the present invention detailing the manner in which it connects to the exhaust and air intake components of a typical diesel truck.

Referring now to the drawings, and more specifically to FIGS. 1 and 2, the diesel air intake pre-heater 10 comprises a heat exchange box 42 that fits within the air cleaner canister 14 that is typically installed on an exterior portion of a diesel truck 12. It is the air filter canister 14 that provides the point of fresh air intake for the diesel engine 24 necessary for the combustion of diesel fuel. Once the combustion process is complete, the spent exhaust gases exit the engine 24 through the exhaust manifold 26 where they enter the engine to exhaust pipe tube 34 which takes them to the exhaust tubing 18 which channels them to the primary exhaust pipe 16 where they exit the exhaust system of the truck 12.

The present invention makes use of the heat generated by the combustion process by channeling the exhaust gases to a heat exchanger 42 which transfers this heat to the air entering the air filter canister 14 prior to its entering the engine 24. The heating of this air increases the rate at which an engine 24 will reach its normal operating temperature by two means: first, the increase of air temperature increases the efficiency of the combustion process (an air fuel mixture will combust more completely at higher temperatures and less fuel is needed to obtain the proper explosive effect) which decreases the time normally required to for an engine 24 to reach operating temperature; and, the increase of air temperature itself helps to warm up cold engine 24 components.

The diversion of the heated exhaust gases from the exhaust tubing 18 is accomplished by connecting the exhaust pipe heat exchange tube 36 at the junction between the exhaust tubing 18 and the engine to the exhaust pipe tube 34. This connection is accomplished by the use of the diverter junction 22 which is a Y-shaped section of exhaust tubing having the lower unified section of the Y being connected to the exhaust tubing 18 and each of the upper non-unified portions being connected to the engine to exhaust pipe tube 34 and the exhaust pipe heat exchange tube 36. This connection allows the exhaust gases to be diverted from the exhaust tubing 18 to the heat exchanger 42 located within the air filter canister 14.

The diversion of the exhaust gases by this mechanism eliminates the use of the primary exhaust pipe 16 as a means of dispelling the gases from the truck 12. This creates the need of providing an alternative means by which the gas can be dispelled from the exhaust system. The present invention accommodates for this need by providing a secondary exhaust pipe 20 which is located on top of the air filter canister 14 and extends upward therefrom. The secondary exhaust pipe 20 is connected (through the heat exchanger 42) to the exhaust pipe heat exchange tube 36 and allows the gases passing through the heat exchanger 42 to exit the exhaust system of the truck 12. The secondary exhaust pipe 20 also has a valved air intake port 32 on its forward facing edge which (under differing circumstances) can be opened to allow for the infusion of fresh air into the exhaust system of the truck 12.

Figure 3:
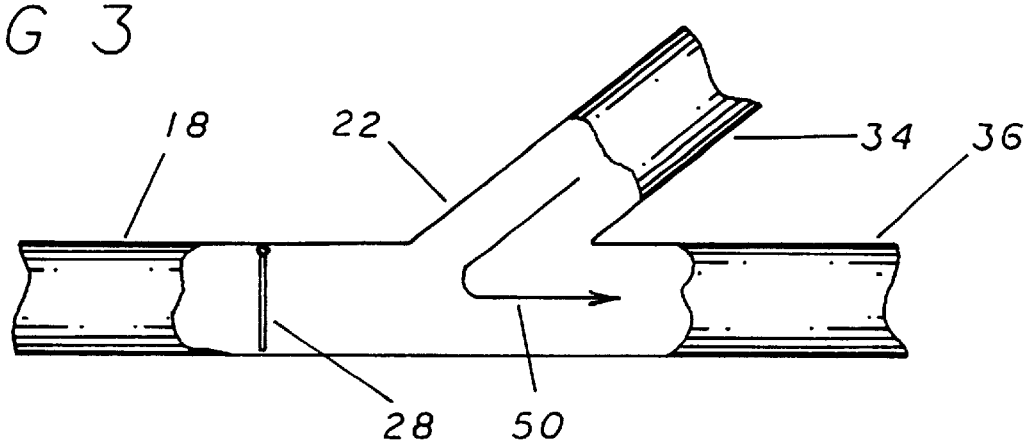
FIG. 3 is a side elevation cut-away view of the exhaust vane component of the present invention detailing the interior construction of this component and the secondary pipe junction and the flow of exhaust gases when the exhaust vane is in the closed position.
Figure 4:
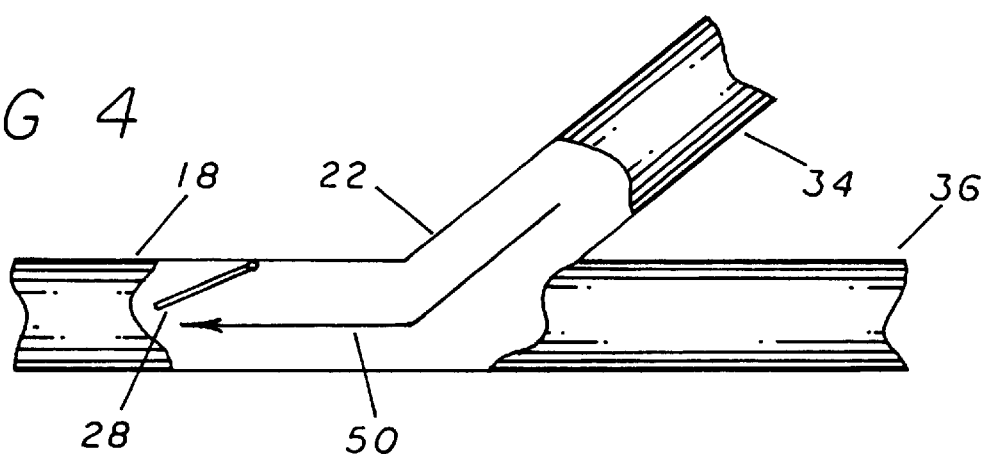
FIG. 4 is a side elevation cut-away view of the exhaust vane component of the present invention detailing the interior construction of this component and the secondary pipe junction and the flow of exhaust gases when the exhaust vane is in the open position.

The operations and construction methods of the diverter junction 22 and the exhaust diverter valve 28 are illustrated in FIGS. 3 and 4. As previously stated, the diverter junction 22 is a Y-shaped component having the lower unified section of the Y being connected to the exhaust tubing 18 and each of the upper non-unified portions being connected to the engine to exhaust pipe tube 34 and the exhaust pipe heat exchange tube 36. Additionally, the diverter junction 22 has a weighted exhaust diverter valve 28 placed within the internal space of its tube. This serves to block the flow of exhaust gases from their normal passage down the exhaust tubing 16 and diverts it to flow into the exhaust pipe heat exchanger tube 36. The diversion of the exhaust gases is illustrated by the directional arrow 50 in FIG. 3.

The exhaust diverter valve 28 only operates to divert the flow of exhaust gases into the exhaust pipe heat exchanger tube 36 when the diesel engine 24 is operating at a preset maximum revolutions (RPM) per minute or less. When the engine is operating at or below this preset RPM (as is typical during warm up or when the engine is idling) the exhaust diverter valve remains closed and the exhaust gases are diverted to the heat exchanger 42. Conversely, when the RPM of the engine 24 surpasses this amount the natural pressure created by the increased flow of exhaust gases produced by an engine operating at higher RPM's forces the exhaust diverter valve to open which allows the gases to flow through the exhaust tubing 18 and exit through the primary exhaust pipe 16. The flow of exhaust gases in the system when the exhaust diverter valve 28 is in the open position is illustrated in FIG. 4 and labeled by the use of the directional arrow 50.

Figure 5:
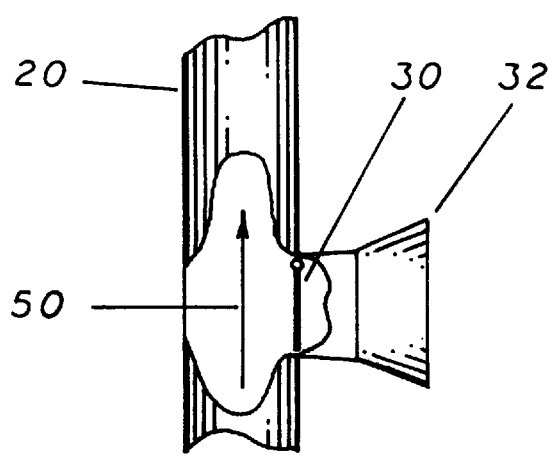
FIG. 5 is a side elevation cut-away view of the intake vane component of the present invention detailing the interior construction of this component and the flow of exhaust gases when the intake vane is in the closed position.
Figure 6:
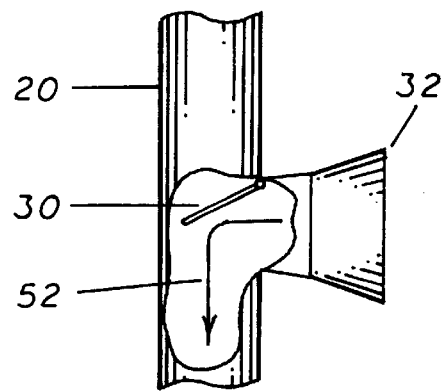
FIG. 6 is a side elevation cut-away view of the intake vane component of the present invention detailing the interior construction of this component and the flow of exhaust gases when the intake vane is in the open position.

The operations and construction methods of the air intake port 32 and the intake diverter valve 30 are illustrated in FIGS. 5 and 6. The air intake port 32 is an open cone shaped apparatus that is connected to an opening in the forward facing surface of the secondary exhaust pipe 20 and has the broader portion of the open cone facing forward in relation to the orientation of the truck 12. This component serves to channel air into the secondary exhaust pipe 20 under certain operating conditions. The flow of air through the air intake port 32 and into the secondary exhaust pipe 20 is controlled by the intake diverter valve 30 which is a weighted valve that closes off the interior of the secondary exhaust pipe 20 from the air intake port 32. The intake diverter valve 30 is set up so that it operates in conjunction with the exhaust diverter valve 28 so that, when the exhaust diverter valve 28 is closed and exhaust gases are being channeled through the secondary exhaust pipe 20, the intake diverter valve is also closed and it will not interfere with the flow of exhaust gases through the secondary exhaust pipe 20. This is illustrated by the directional arrow 50 which indicates the flow of gases through the secondary exhaust pipe 20 in this configuration.

Conversely, when the exhaust diverter valve 28 is open (as a result of higher engine 24 RPM) the truck 12 is generally moving forward and the exhaust gases are free to pass out of the primary exhaust pipe 16. The forward motion of the truck 12 generates air pressure on the intake diverter valve 30 which serves to open it and allow the air to enter the secondary exhaust pipe 20 and, therefore, the truck's 12 exhaust system. The infusion of air into the system in this operating configuration serves to create a positive pressure on the gases in the exhaust system which insures that the gases will exit the primary exhaust pipe 16 as was originally intended by the designers. The flow of air into the secondary exhaust pipe 20 as facilitated by the opening of the intake diverter valve 30 is illustrated by the directional arrow labeled as 52 in FIG. 6. It should also be stated at this point that when the present invention is used on slow moving or non-moving industrial equipment such as tractors and the like, the intake diverter valve 30 and the air intake port 32 would be non-functioning and thus, omitted, as sufficient vehicle speed may never be obtained for the proper operation of these parts.

Figure 7:
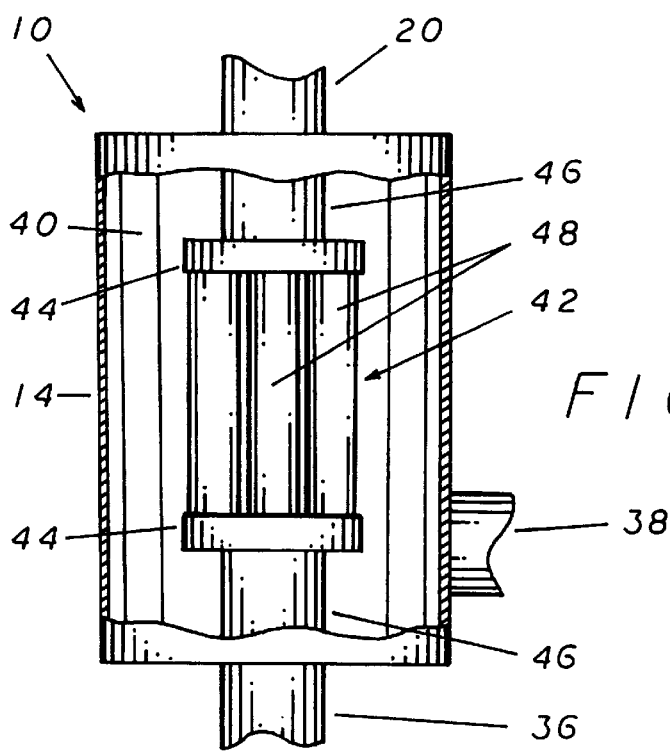
FIG. 7 is a side elevation cut-away view of the air cleaner canister component of the present invention detailing the method of construction of the heat exchanger and the manner in which it is contained within the filter canister.
Figure 8:
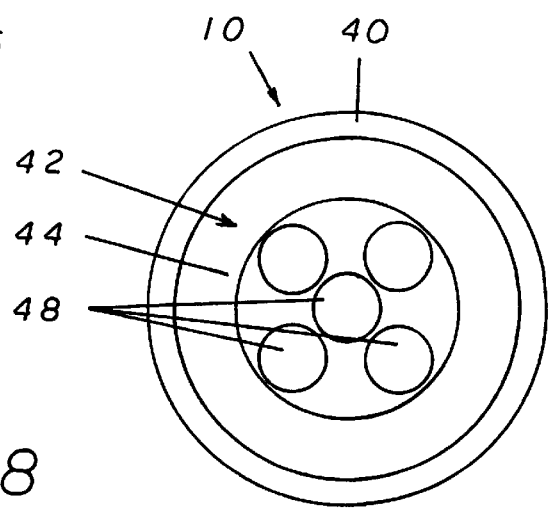
FIG. 8 is a top elevation cut-away view of the heat exchanger component of the present invention detailing the manner of construction perspective of an alternative embodiment of the present invention showing its general manner of construction and its major external components.

The method of construction of the heat exchanger 42 is illustrated in FIGS. 7 and 8. As previously stated, the heat exchanger unit 42 is housed within the air cleaner canister 14 which is located externally on most diesel trucks 12. Primarily, the air cleaner canister 14 serves as the housing component for the air filter 40 through which fresh air is drawn prior to its passing through the air cleaner to engine tube 38. The heat exchanger 42 is placed in the space within the air filter 40 so that when air is drawn through the air cleaner canister 14 and the air filter 40 it flows in and around the heat exchanger unit 42.

The heat exchanger 42 itself is built of two exchanger primary tubes 46 the upper of which connects at its outer end to the secondary exhaust pipe 20 and at its inner end to the upper end of the exchanger manifold 44. The other exchanger primary tube 46 is connected at its inner end to the lower end of the exchanger manifold 44 and at its outer end to the exhaust pipe heat exchanger tube 36. The portion between the two exchanger manifold 44 components is spanned by a plurality smaller secondary exchanger tubes 48. The purpose of the exchanger secondary tubes 48 is to maximize the outer surface area of the heat exchanger 42 which increases the efficiency at which heat is transferred from the exhaust gases in the interior of the heat exchanger 42 to the fresh air on the outside of the heat exchanger 42. Thus, air being drawn through the air cleaner canister 14 is heated by hot exhaust gases passing through the heat exchanger 42 before it enters the diesel engine 24 which helps the engine 12 to reach normal operating temperatures in cold weather more rapidly.

Although the present invention has been described in considerable detail with reference to certain preferred versions thereof, other versions are possible. Therefore, the spirit and scope of the appended claims should not be limited to the description of the preferred versions contained herein.

What is claimed is:

1. An engine air intake pre-heater for use on a piston type engine having an air intake system including an air filter system for the intake of clean air as well as a primary exhaust system for the discharge of exhaust gases, said air intake pre-heater comprising:

a secondary exhaust gas outlet connected to said primary exhaust system;

a gate means for diverting said exhaust gases to said secondary exhaust gas outlet at a predetermined exhaust gas pressure; and a heat exchanger connected to said secondary exhaust gas outlet and placed so as to preheat said clean air as it passes through said air intake system.

2. An engine air intake pre-heater as in claim 1 further comprising an air intake port connected to said secondary exhaust gas outlet.

3. An engine air intake pre-heater as in claim 2 wherein said air intake port further comprises a diverter valve.

4. An engine air intake pre-heater as in claim 3 wherein said diverter valve is a swinging gate type valve weighted so as to open at a given pressure.

5. An engine air intake pre-heater as in claim 1 wherein said gate means is a swinging diverter valve preset to swing open when a given amount of pressure is supplied by the exhaust gas.

6. An engine air intake pre-heater as in claim 5 wherein said heat exchanger is placed within said air filter and with said secondary exhaust gas outlet passing-through said heat exchanger.

7. An engine air intake pre-heater for use on a piston type engine having an air intake system including an air filter system for the intake of clean air as well as a primary exhaust system for the discharge of exhaust gases, said air intake pre-heater comprising:

a secondary exhaust gas outlet connected to said primary exhaust system;

a swinging gate valve with said primary exhaust system for diverting said exhaust gases to said secondary exhaust gas outlet at a predetermined exhaust gas pressure;

a heat exchanger connected to said secondary exhaust gas outlet and placed so as to preheat said clean air as in passes through said air intake system; and an air intake port connected to said secondary exhaust gas outlet.

8. An engine air intake pre-heater as in claim 7 wherein said swinging gate valve is preset to swing open when a given amount of pressure is supplied by the exhaust gas, so as to let said exhaust gas exit via said primary exhaust system.

9. An engine air intake pre-heater as in claim 8 wherein said swinging gate valve is positioned so as to divert said exhaust gas to said secondary exhaust gas outlet when said swinging gate valve is in a closed position.

10. An engine air intake pre-heater as in claim 9 wherein said air intake port further comprises a diverter valve.

11. An engine air intake pre-heater as in claim 10 wherein said diverter valve is a second swinging gate type valve weighted so as to open at a given pressure.

12. An engine air intake pre-heater as in claim 11 wherein said heat exchanger is placed within said air filter and with said secondary exhaust gas outlet passing through said heat exchanger.

* * * * *